US012292065B2

(12) United States Patent
Muntz et al.

(10) Patent No.: US 12,292,065 B2
(45) Date of Patent: May 6, 2025

(54) STRUCTURAL BLIND SLEEVES AND ASSOCIATED SYSTEMS AND METHODS FOR CLAMPING A FIRST STRUCTURE RELATIVE TO A SECOND STRUCTURE TO YIELD A CLAMPED-UP STRUCTURE

(71) Applicant: The Boeing Company, Chicago, IL (US)

(72) Inventors: Nathan A. Muntz, Everett, WA (US); Tanni Sisco, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 269 days.

(21) Appl. No.: 17/669,686

(22) Filed: Feb. 11, 2022

(65) Prior Publication Data
US 2023/0258215 A1  Aug. 17, 2023

(51) Int. Cl.
*F16B 19/02* (2006.01)
*B64C 1/06* (2006.01)
*B64F 5/10* (2017.01)

(52) U.S. Cl.
CPC ............. *F16B 19/02* (2013.01); *B64C 1/069* (2013.01); *B64F 5/10* (2017.01)

(58) Field of Classification Search
CPC ............................ F16B 19/02; F16B 19/1045
See application file for complete search history.

(56) References Cited

U.S. PATENT DOCUMENTS

| | | | | |
|---|---|---|---|---|
| 3,136,203 A | * | 6/1964 | Davis | F16B 19/1072 29/524.1 |
| 3,215,026 A | * | 11/1965 | Davis | F16B 37/067 411/968 |
| 3,263,466 A | | 8/1966 | Shackelford | |
| 3,345,900 A | * | 10/1967 | Villo | F16B 19/1063 411/41 |
| 3,461,771 A | * | 8/1969 | Briles | F16B 19/1081 411/34 |

(Continued)

FOREIGN PATENT DOCUMENTS

| | | |
|---|---|---|
| EP | 152531 | 8/1985 |
| EP | 775837 | 2/2001 |

(Continued)

OTHER PUBLICATIONS

European Patent Office, Extended European Search Report, App. No. 22213846.3 (May 15, 2023).

(Continued)

*Primary Examiner* — Jason L Vaughan
*Assistant Examiner* — Amanda Kreiling
(74) *Attorney, Agent, or Firm* — Walters & Wasylyna LLC

(57) ABSTRACT

A structural blind sleeve includes a monolithic body. The monolithic body has a sleeve shank having an elongated tubular structure defining a proximal portion and a distal portion, the sleeve shank having a structural portion proximate the proximal portion, a threaded portion proximate the distal portion, and a softened portion between the structural portion and the threaded portion. The structural portion is capable of carrying a clamp-up structural load. The monolithic body further includes a sleeve head connected to the proximal portion of the sleeve shank.

20 Claims, 12 Drawing Sheets

(56) References Cited

U.S. PATENT DOCUMENTS

| | | | |
|---|---|---|---|
| 4,499,647 A * | 2/1985 | Sakamura | F16B 19/10 |
| | | | 29/524.1 |
| 4,747,202 A | 5/1988 | Beals | |
| 4,875,815 A | 10/1989 | Phillips, II | |
| 5,810,530 A * | 9/1998 | Travis | F16B 19/1054 |
| | | | 411/69 |
| 6,537,005 B1 | 3/2003 | Denham | |
| 6,868,757 B2 | 3/2005 | Hufnagl et al. | |
| 7,033,120 B2 | 4/2006 | Hufnagl et al. | |
| 7,524,154 B2 | 4/2009 | LaConte et al. | |
| 7,857,563 B2 | 12/2010 | Pratt | |
| 8,057,144 B2 | 11/2011 | Johnson et al. | |
| 8,777,533 B2 | 7/2014 | Hufnagl et al. | |
| 9,593,706 B2 | 3/2017 | Bickford et al. | |
| 10,006,478 B2 | 6/2018 | Hufnagl et al. | |
| 10,774,863 B2 | 9/2020 | Simpson et al. | |
| 11,143,226 B2 | 10/2021 | Vovan | |
| 2006/0078399 A1 * | 4/2006 | Coddington | F16B 19/1054 |
| | | | 411/38 |
| 2009/0053006 A1 | 2/2009 | Hufnagl et al. | |
| 2010/0224086 A1 | 9/2010 | Scheinberger | |
| 2011/0076109 A1 * | 3/2011 | Keller | F16B 19/1045 |
| | | | 470/29 |
| 2018/0112702 A1 | 4/2018 | Gaertner et al. | |

FOREIGN PATENT DOCUMENTS

| | | |
|---|---|---|
| GB | 1 222 633 | 2/1971 |
| WO | WO 2004/106753 | 12/2004 |
| WO | WO 2010/111593 | 9/2010 |
| WO | WO 2021/41508 | 3/2021 |

OTHER PUBLICATIONS

NAS1329 and NAS1330 Rivnut ® Fasteners, Liberty Engineering (2014). https://www.libertyeng.com/products/nas1329andnas1330rivnut/.

Blind Bolts, Monogram Aerospace Fasteners (2019). https://trsaero.com/monogramaerospace/prodcuts/blind-bolts/.

OPTIBLIND™ Blind Fastener, Lisi Aerospace. https://www.lisi-aerospace.com/en/product/optiblind-blind-fastener/.

Ergo-Tech® Blind Fastening System, Howmet Aerospace (2021). https://catalog.howmetfasteners.com/category/fasteners.

European Patent Office, "Communication pursuant to Article 94(3) EPC," App. No. 22213846.3 (Dec. 3, 2024).

* cited by examiner

STRUCTURAL BLIND SLEEVES AND ASSOCIATED SYSTEMS AND METHODS FOR CLAMPING A FIRST STRUCTURE RELATIVE TO A SECOND STRUCTURE TO YIELD A CLAMPED-UP STRUCTURE

FIELD

This application relates to mechanical fasteners and, more particularly, to structural blind sleeves and associated systems and methods for clamping a first structure relative to a second structure.

BACKGROUND

Mechanical fasteners are widely used for joining two or more components of a structural assembly. For example, mechanical fasteners are extensively used for joining the structural components of the airframe of an aircraft.

Blind fastener systems are a particular type of mechanical fastener. Blind fastener systems include a core bolt and a sleeve, wherein both the core bolt and the sleeve are inserted into an appropriate bore in a structural assembly and engage the structural assembly from just one side of the structural assembly, without the need for accessing the opposite side of the structural assembly. Therefore, blind fastener systems are particularly suitable for use in applications where access to one side of a structural assembly is difficult or unavailable.

Current tooling and installation methods for blind fastener systems utilize sleeve components as a means for retaining a bolt. The sleeve typically does not provide clamping support for the structures being fastened together. Further, many current tooling and installation methods for blind fastener systems are typically quite complex, difficult to manufacture, and challenging to integrate with robotics. These systems specifically struggle with installation at varying (non-normal) angles, installation where sealant is required (which may adhere to, and subsequently jam or plug the internal drive mechanism of the nose piece), and reducing cost.

Accordingly, those skilled in the art continue with research and development efforts in the field of mechanical fasteners and structure clamp-up.

SUMMARY

Disclosed are structural blind sleeves.

In one example, the disclosed structural blind sleeve includes a monolithic body. The monolithic body has a sleeve shank having an elongated tubular structure defining a proximal portion and a distal portion, the sleeve shank having a structural portion proximate the proximal portion, a threaded portion proximate the distal portion, and a softened portion between the structural portion and the threaded portion. The structural portion is capable of carrying a clamp-up structural load. The monolithic body further includes a sleeve head connected to the proximal portion of the sleeve shank.

Also disclosed are systems for clamping a first structure relative to a second structure to yield a clamped-up structure, the first structure and the second structure defining a through-bore.

In one example, the disclosed system includes a structural blind sleeve. The structural blind sleeve includes a sleeve shank having an elongated tubular structure defining a proximal portion and a distal portion, the sleeve shank having a structural portion proximate the proximal portion. The structural blind sleeve further includes a sleeve head connected to the proximal portion of the sleeve shank. The system further includes a tool for installing the structural blind sleeve into the through-bore, the tool includes a bearing member configured to engage the sleeve head of the structural blind sleeve and axially retain the sleeve head against the first structure. The tool further includes a threaded shaft configured to engage the sleeve shank of the structural blind sleeve and toward the structural portion of the sleeve shank to form a bulb in the sleeve shank, wherein the bearing member concentrically surrounds the threaded shaft, and wherein axial pulling of the threaded portion provides compressive loading on the structural blind sleeve to yield buckling of the sleeve shank.

Also disclosed are methods for clamping a first structure relative to a second structure to yield a clamped-up structure, the first structure and the second structure defining a through-bore.

In one example, the disclosed method includes steps of (1) inserting a structural blind sleeve into the through-bore, the structural blind sleeve including (a) a sleeve shank having an elongated tubular structure defining a proximal portion and a distal portion, the sleeve shank comprising a structural portion proximate the proximal portion and a threaded portion proximate the distal portion; and (b) a sleeve head connected to the proximal portion of the sleeve shank; (2) threading a threaded shaft of a tool into engagement with the threaded portion of the sleeve shank of the structural blind sleeve; (3) applying an axial bearing force to the sleeve head of the structural blind sleeve to axially retain the sleeve head against the first structure; and (4) while the threaded shaft is threaded into engagement with the threaded portion of the sleeve shank and the axial bearing force is applied to the sleeve head, applying an axial pulling force to the threaded shaft to form a bulb in the sleeve shank.

Also disclosed is a method for tacking a first structure to a second structure, the first structure and the second structure defining at least a first through-bore and a second through-bore.

In one example, the disclosed method includes buckling a proximal portion of a sleeve shank of a structural blind sleeve to sandwich a first structure to a second structure between a sleeve head and a bulb portion.

Other examples of the disclosed structural blind sleeves and associated systems and methods will become apparent from the following detailed description, the accompanying drawings, and the appended claims.

DETAILED DESCRIPTION

Figure 1A:
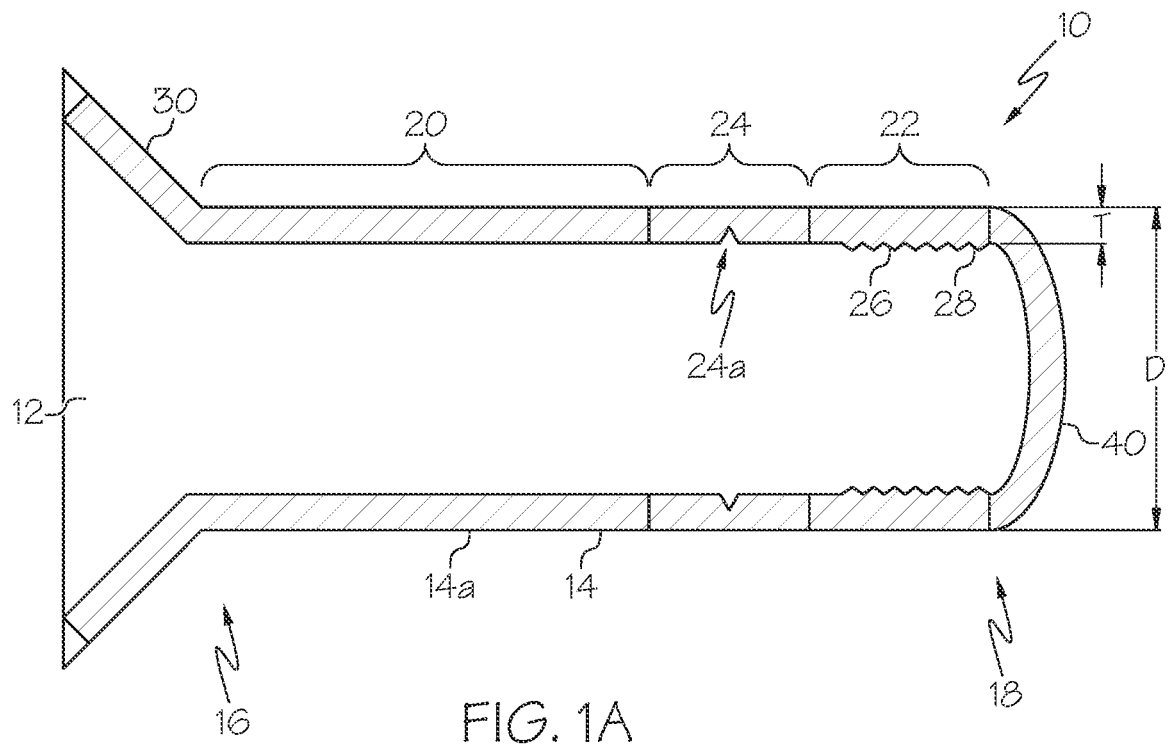
FIG. 1A is a side cross-sectional view of a structural blind sleeve.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according to the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

References throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

Referring to FIG. 1A, disclosed is a structural blind sleeve 10. The structural blind sleeve 10 may be compatible with an off-the-shelf bolt 150. The structural blind sleeve 10 is formable into a clamp-up fastener 250 that is configured to serve as a tack operation to help tack a first structure 204a with a second structure 204b to yield a stacked assembly prior to it becoming a clamped-up structured 204 upon installation of a fastener or bolt 150. The fastener or bolt 150 may be installed at any time prior to a load being placed upon the structural blind sleeve 10 that is greater than clamp-up structural load 50 and/or tack load, see FIG. 6C. Thus, the clamp-up fastener 250 formed by the sleeve 10 is capable of replacing a one-op assembly system needed to maintain clamp up prior to installation of a bolt 150 or fastener into a stacked structure.

Still referring to FIG. 1A, the structural blind sleeve 10 includes a monolithic body 12 that is high strength. The monolithic body 12 includes a sleeve shank 14 having an elongated tubular structure 14a defining a proximal portion 16 and a distal portion 18. The sleeve shank 14 has a structural portion 20 proximate the proximal portion 16 and a threaded portion 22 proximate the distal portion 18. In one example, the threaded portion 22 of the sleeve shank 14 comprises internal threads 26. In another example, a portion 28 of the internal threads 26 are deformed 29A or out-of-pitch 29B. In yet another example, the threaded portion 22 may be tapered for light-interference fit.

The monolithic body 12 may further include an end cap 40 connected to the distal portion 18 of the sleeve shank 14. The end cap 40 may be fluid-tight and may provide electromagnetic environment (EME) protection. The monolithic body 12 may include any material having requisite material properties for the intended application. In one example, the monolithic body 12 comprises at least one of stainless steel, aluminum bronze, copper beryllium, copper nickel tin, and a nickel-chromium-molybdenum alloy. In another example, the monolithic body 12 includes one or more of A286, 15 SPH, Aluminum Bronze, Copper Beryllium, Copper Nickel Tin, and Inconel 718. In yet another example, the monolithic body 12 may further include one or more coating, such as a conductive coating, to meet EME material property requirements.

Still referring to FIG. 1A, the sleeve shank 14 has a softened portion 24 located between the structural portion 20 and the threaded portion 22. In one example, the softened portion 24 of the sleeve shank 14 is annealed. In another example, the softened portion 24 of the sleeve shank 14 comprises a cut or score. As shown in FIG. 1A, the softened portion 24 of the sleeve shank 14 may include a notched portion 24a with an internal circumferential notch. The softened portion 24 may be configured to laterally deform under compression. In yet another example, as shown in FIG. 1A, the internal circumferential notch may include a V-shaped notch.

Figure 6A:
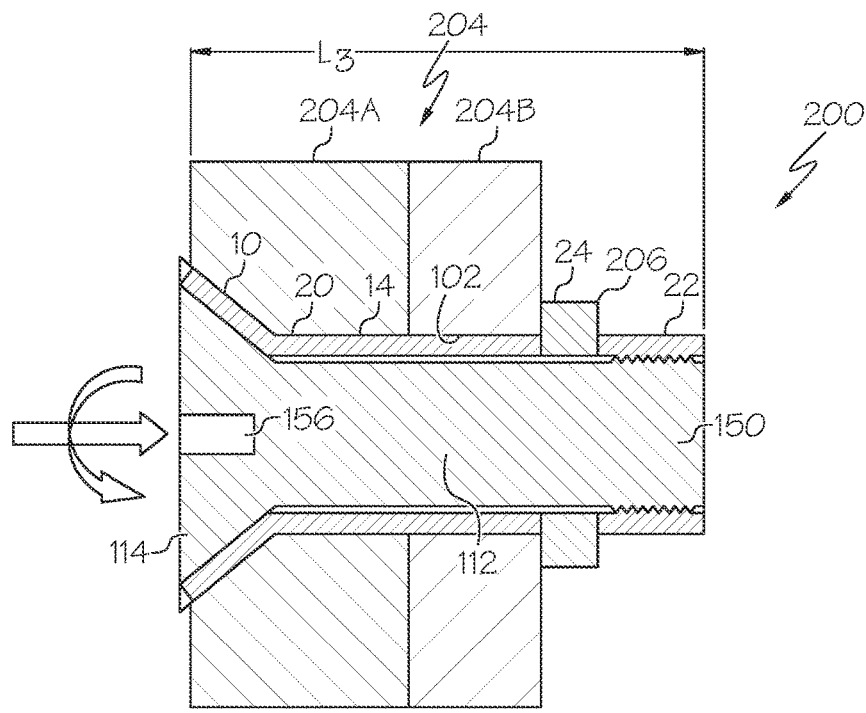
FIG. 6A is a side cross-sectional view of the structural blind sleeve of FIG. 1A in a structure.
Figures 6B, 6C:
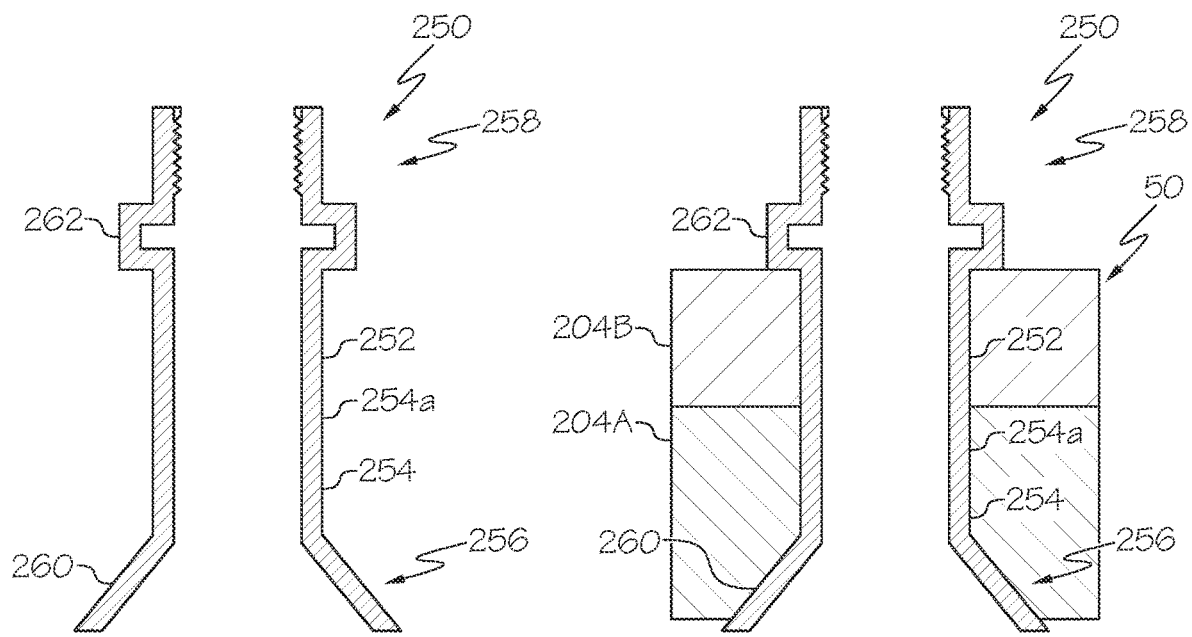
FIG. 6B is a side cross-sectional view of a clam-up fastener.
FIG. 6C is a side cross-sectional view of a clamp-up fastener in a structure.

In one example, the structural portion 20 is capable of carrying a clamp-up structural load 50, see FIG. 6C. The amount of clamp-up structural load 50 may be based upon an outside diameter D of the sleeve shank 14. The clamp-up structural load 50 may include tensile loading, tack loading, and shear loading. In one example, the clamp-up structural load 50 is at least about 95 ksi in shear.

Still referring to FIG. 1A, in one or more example, the sleeve shank 14 has an outside diameter D and a sleeve wall thickness T. In one example, the outside diameter is about 0.25 inches and the sleeve wall thickness T of about 0.015 inches to about 0.030 inches. In another example, the outside diameter is about 0.2665". In yet another example, the outside diameter is at least 0.275".

Still referring to FIG. 1A, the structural blind sleeve 10 further includes a sleeve head 30 connected to the proximal portion 16 of the sleeve shank 14. The sleeve head 30 may be flanged. In one example, the sleeve head 30 is a countersunk head and may further have a countersink that is approximately 130°. In another example, the sleeve head 30 is a crown head. In yet another example, sleeve head 30 is a protruding head.

In one or more examples, the structural portion 20 of the sleeve shank 14 has a first tensile strength and the softened portion 24 of the sleeve shank 14 has a second tensile strength. The softened portion 24 may be configured to laterally deform under compression. In one example, the first tensile strength is at least 140 ksi and the second tensile strength is at most 80 percent of the first tensile strength. In another example, the first tensile strength is at least 150 ksi, and wherein the second tensile strength is at most 75 percent of the first tensile strength. In yet another example, the first tensile strength is at least 160 ksi, and wherein the second tensile strength is at most 70 percent of the first tensile strength.

Figure 1B:
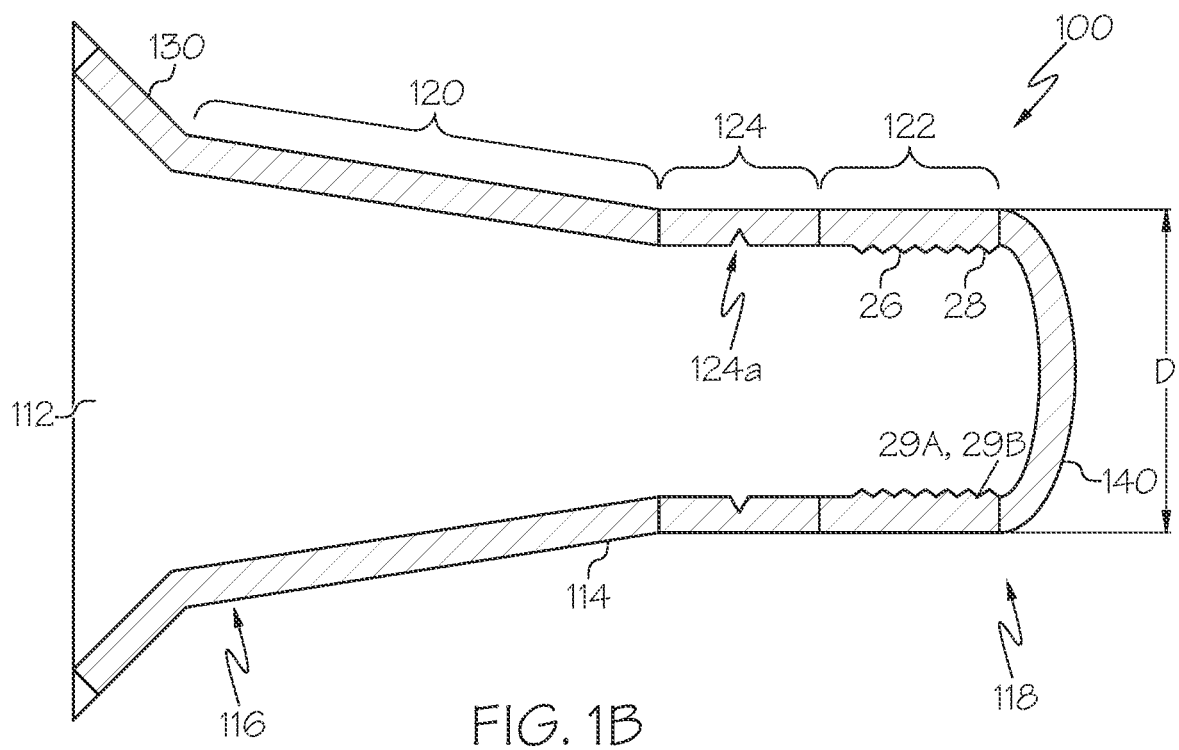
FIG. 1B is a side cross-sectional view of a structural blind sleeve.

Referring to FIG. 1B, in one or more examples, disclosed is a tapered structural blind sleeve 100 having a tapered monolithic body 112. In one example, the tapered structural blind sleeve 100 is tapered such that the sleeve shank 114 is tapered from proximate the proximal portion 116 to proximate the distal portion 118. The tapered structural blind sleeve 100 includes a sleeve head 130 connected to the proximal portion 116 of the sleeve shank 114. The sleeve head 130 may be flanged. In one example, the sleeve head 130 is a countersunk head may further have a countersink that is approximately 130°. In another example, the sleeve head 260 is a crown head. In yet another example, sleeve head 130 is a protruding head.

Still referring to FIG. 1B, the tapered structural blind sleeve 100 includes a threaded portion 122 proximate the distal portion 118 and a softened portion 124 located between the threaded portion 122 and structural portion 120 proximate the proximal portion 116. The softened portion 124 may further include a notched portion 124a with an internal circumferential notch. The softened portion 124 may be configured to laterally deform under compression. The tapered structural blind sleeve 100 may further include an end cap 140 connected to the distal portion 118 of the sleeve shank 114. The end cap 140 may be fluid-tight and may provide electromagnetic environment (EME) protection. In another example, as shown in FIG. 1B, the internal circumferential notch may include a V-shaped notch.

Figure 2:
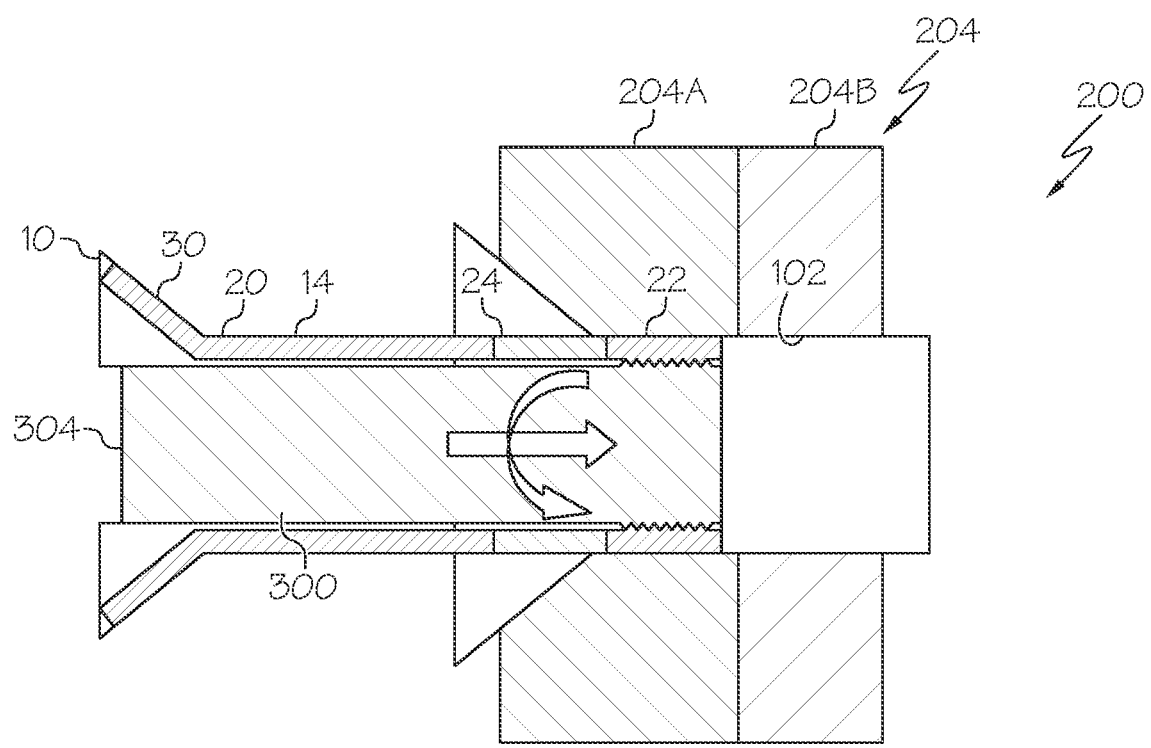
FIG. 2 is a side cross-sectional view of the structural blind sleeve of FIG. 1A in a structure.
Figure 3:
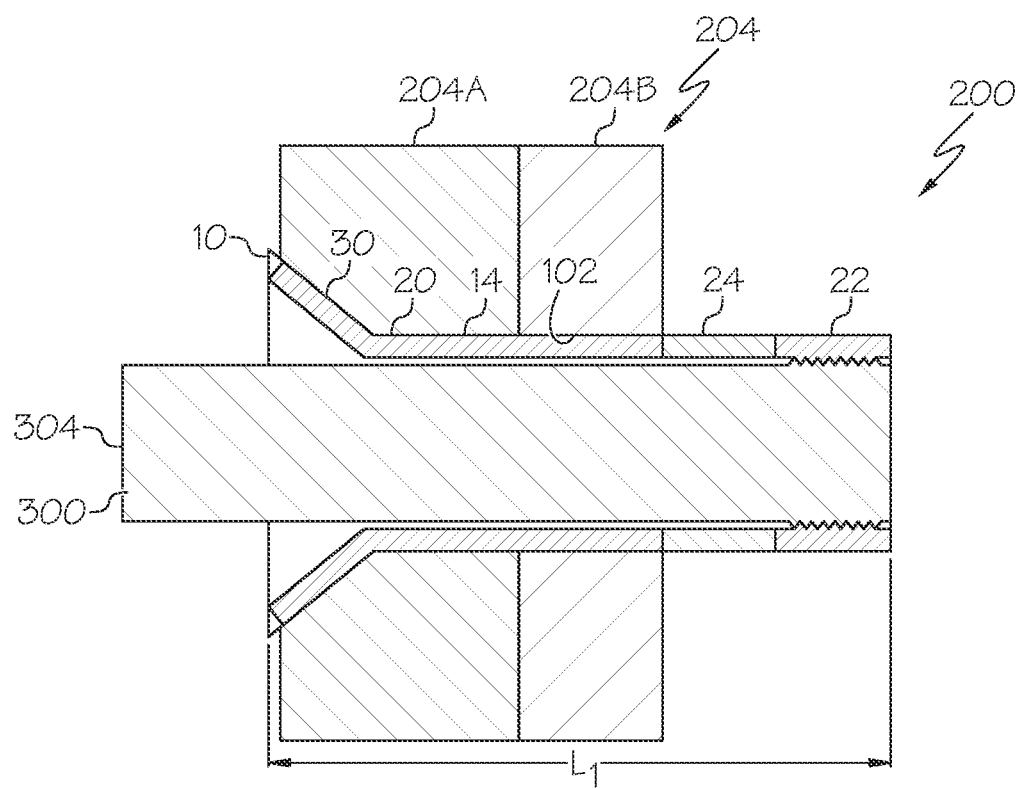
FIG. 3 is a side cross-sectional view of the structural blind sleeve of FIG. 1A in a structure.

Referring to FIG. 2, disclosed is a system 200 for clamping a first structure 204A relative to a second structure 204B to yield a clamped-up structure 204. The first structure 204A and the second structure 204B define a through-bore 102 for receiving a structural blind sleeve 10. The through-bore 102 may be sized and shaped to receive the structural portion 20 of the sleeve shank 14 with an interference fit. In another example, the through-bore 102 is sized and shaped to receive the structural portion 20 of the sleeve shank 14 with a clearance fit. One of the first structure 204A and second structure 204B may have a countersink that is shaped and sized to receive the structural blind sleeve 10.

In one or more examples, the first structure 204A of the clamped-up structure 204 includes a composite material. The composite material may include carbon fibers embedded in a polymeric matrix material. Further, in another example, the second structure 204B of the clamped-up structure 204 includes one of a composite material and a metallic material. In yet another example, the first structure 204A of the clamped-up structure 204 is compositionally different than the second structure 204B of the clamped-up structure 204. The clamped-up structure 204 may be an aerospace component, such as a wing panel.

The system 200 includes a structural blind sleeve 10. The structural blind sleeve 10 includes a sleeve shank 14 having an elongated tubular structure 14a defining a proximal portion 16 and a distal portion 1. The sleeve shank 14 includes a structural portion 20 proximate the proximal portion 16 and a sleeve head 30 connected to the proximal portion 16 of the sleeve shank 14. In one example, the sleeve shank 14 further includes a threaded portion 22 proximate the distal portion 18, the threaded portion 22 configured to threadedly engage with the threaded shaft 304 of the tool 300.

Referring to FIG. 1A, in one example, the sleeve shank 14 of the structural blind sleeve 10 may further include a notched portion 24a between the structural portion 20 and the threaded portion 22. The sleeve shank 14 of the structural blind sleeve 10 may further include a softened portion 24 between the structural portion 20 and the threaded portion 22. The notched portion 24a and the softened portion 24 may allow formation of the bulb 206 upon application of force to the structural blind sleeve 10. For example, the softened portion 24 may be configured to buckle outwardly to form the bulb 206 of the sleeve shank 14. The softened portion 24 may further be configured to laterally deform under compression.

Still referring to FIG. 2, in one or more examples, the system 200 includes a tool 300 for installing the structural blind sleeve 10 into the through-bore 102. The tool 300 includes a bearing member 302 configured to engage the sleeve head 30 of the structural blind sleeve 10 and axially retain the sleeve head 30 against the first structure 204A. The tool 300 is configured to pull a pre-determined load and collapse in the softened portion 24 to form the bulb 206. The tool 300 may include an outside tool and a center tool that work together, simultaneously, by providing counteracting forces to the structural blind sleeve 10 to keep the structural blind sleeve 10 from being pulled out of place as the center tool portion is being pulled. While the center portion or threaded shaft 304 of the tool 300 pulls, the outside portion or bearing member 302 of the tool 300 pushes or applies an axial force to the countersink portion of the structural blind sleeve 10 to maintain clamp-up and prevent structural separation, see FIG. 4.

The tool 300 further includes a threaded shaft 304 configured to engage the sleeve shank 14 of the structural blind sleeve 10 and for axially pulling 605 the threaded portion 22 toward the structural portion 20 of the sleeve shank 14 to form a bulb 206 in the sleeve shank 14. In one example, the bearing member 302 concentrically surrounds the threaded shaft 304. In an example, axial pulling of the threaded portion 22 provides compressive loading 445 on the structural blind sleeve 10 to yield buckling 610 of the sleeve shank 14. Further, the compressive loading 445 may be a result of loading resulting from the bearing member 302 working opposite from the threaded shaft 304 Upon buckling 610 of the sleeve shank 14, the bulb 206 may be formed.

Figure 7A:
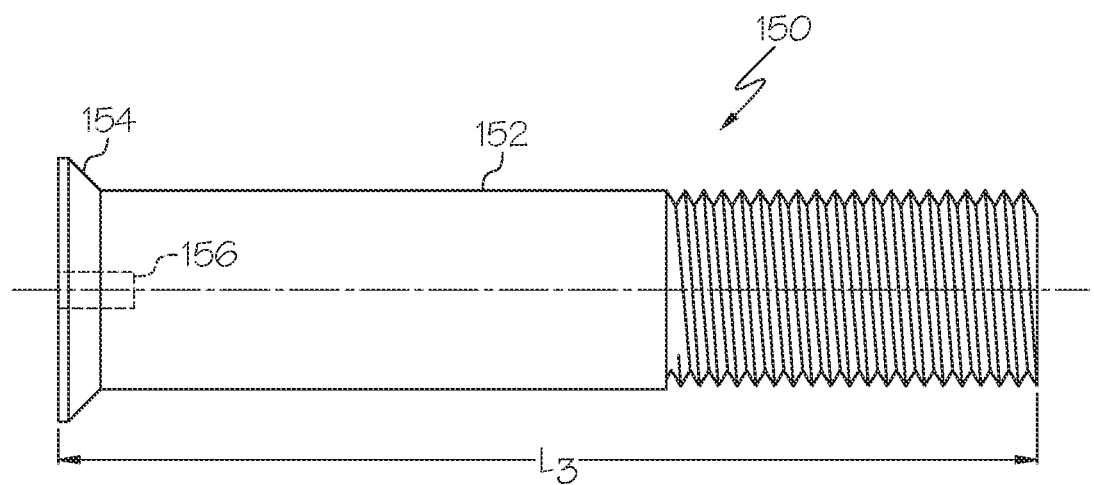
FIG. 7A is a side view of a bolt.

Referring to FIG. 7A, the system 200 may further include a bolt 150 that is threadable into engagement with the threaded portion 22 of the sleeve shank 14 after removal of the tool 300, wherein removal is performed by applying axial force $F_3$ away from the bulb 206. As illustrated in FIG. 7A, the bolt 150 includes a bolt shank 152 and a bolt head 154 connected to the bolt shank 152. In one or more examples, the bolt head 154 defines a torquing feature 156 recessed into the bolt head 154. The bolt 150 may include any material having requisite material properties for structural integrity of the clamped-up structure 204. In one example, the bolt 150 includes a metallic material.

In one example, the structural blind sleeve 10 has a first length $L_1$ prior to the bulb 206 being formed in the sleeve shank 14. After the bulb 206 is formed in the sleeve shank 14, the structural blind sleeve 10 has a second length $L_2$. Further, the bolt 150 has a third length $L_3$. In one example, the third length $L_3$ is greater than or equal to the second length $L_2$.

Figure 7B:
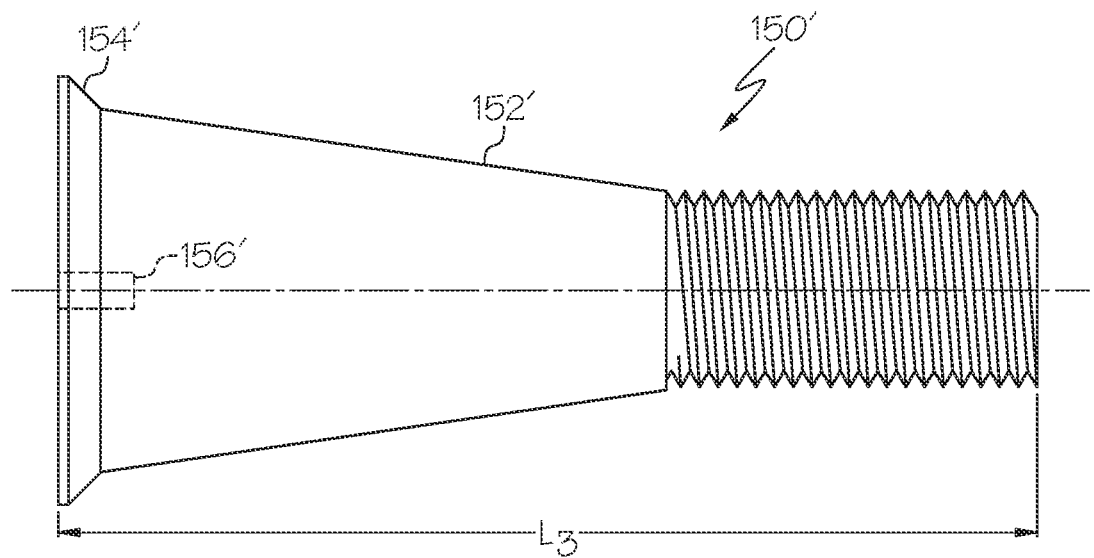
FIG. 7B is a side view of a bolt.

Referring to FIG. 7B, in one or more examples, the system 200 may include a tapered bolt 150' that is threadable into engagement with the threaded portion 122 of the tapered structural blind sleeve 110 of FIG. 1B after removal of the tool 300, wherein removal is performed by applying axial force $F_3$ away from the bulb 206. As illustrated in FIG. 7B, the bolt 150' includes a tapered bolt shank 152' and a bolt head 154' connected to the tapered bolt shank 152'. In one or more examples, the bolt head 154' defines a torquing feature 156' recessed into the bolt head 154'. The bolt 150' may include any material having requisite material properties for structural integrity of the clamped-up structure 204. In one example, the bolt 150' includes a metallic material. The tapered bolt 150' may expand the tapered structural blind sleeve 110 radially, thus providing increased fatigue performance and electromagnetic environment (EME) protection.

Figure 10:
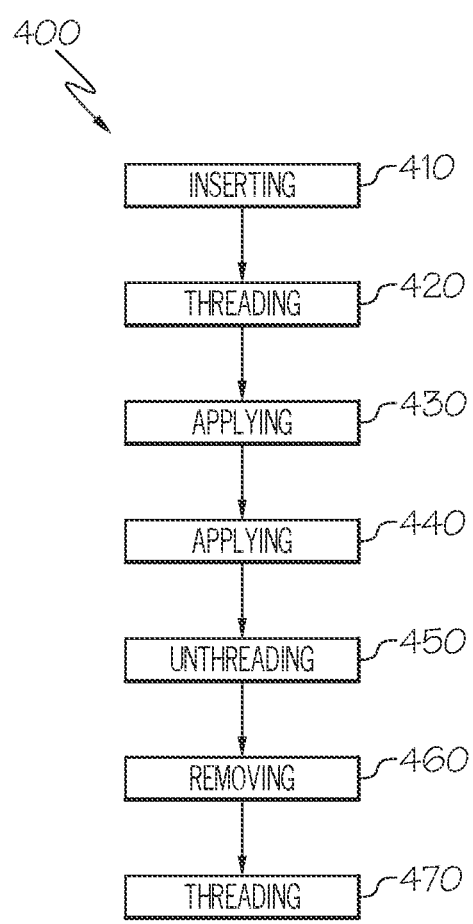
FIG. 10 is a flow diagram of a method for clamping a first structure relative to a second structure.

Referring to FIG. 10, disclosed is a method 400 for clamping a first structure 204A relative to a second structure 204B to yield a clamped-up structure 204. The first structure 204A and the second structure 204B define a through-bore 102. In one example, the method 400 includes inserting 410 a structural blind sleeve 10 into the through-bore 102.

Referring to FIG. 1, the structural blind sleeve 10 includes a sleeve shank 14 having an elongated tubular structure 14a defining a proximal portion 16 and a distal portion 18. The sleeve shank 14 includes a structural portion 20 proximate the proximal portion 16 and a threaded portion 22 proximate the distal portion 18. a sleeve head 30 connected to the proximal portion 16 of the sleeve shank 14.

Referring back to FIG. 10, the method 400 includes threading 420 a threaded shaft 304 of a tool 300 into engagement with the threaded portion 22 of the sleeve shank 14 of the structural blind sleeve 10. FIG. 2 illustrates treading 420 of the tool 300 into engagement with the treaded portion 22 of the sleeve shank 14.

Figure 4:
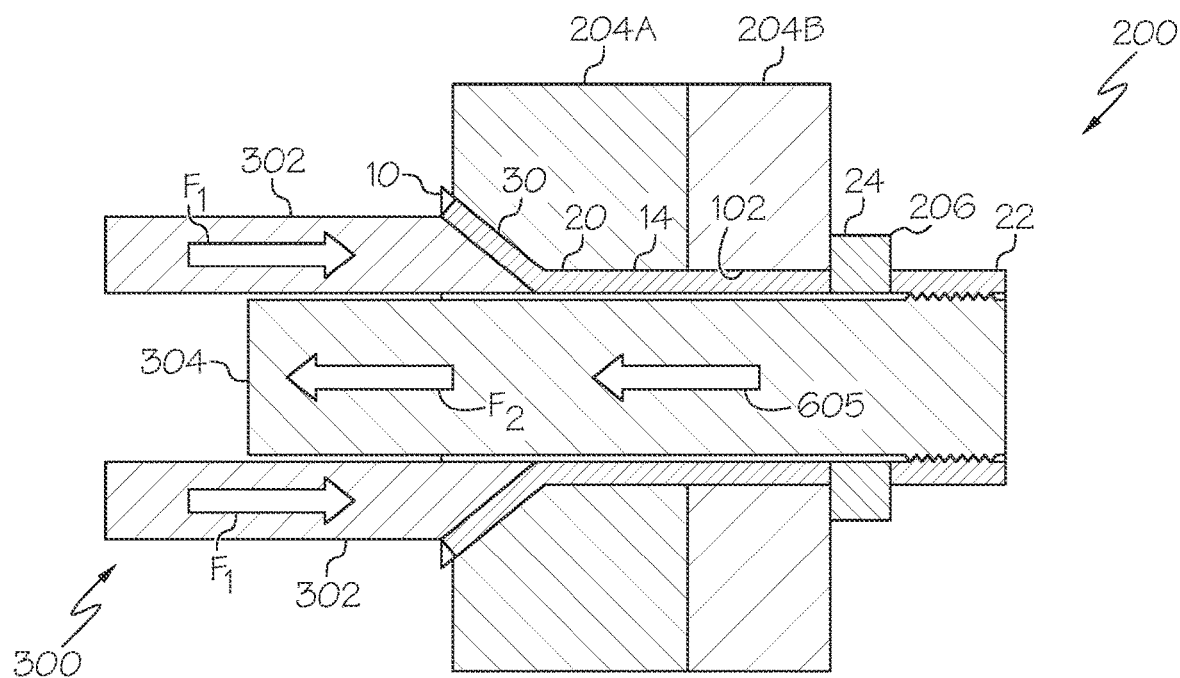
FIG. 4 is a side cross-sectional view of the structural blind sleeve of FIG. 1A in a structure.

Still referring to FIG. 10, the method 400 further includes applying 430 an axial bearing force $F_1$ to the sleeve head 30 of the structural blind sleeve 10 to axially retain the sleeve head 30 against the first structure 204A, see FIG. 4.

In one or more examples, while the threaded shaft 304 is threaded into engagement with the threaded portion 22 of the sleeve shank 14 and the axial bearing force $F_1$ is applied to the sleeve head 30, the method 400 further includes applying 440 an axial pulling force $F_2$ to the threaded shaft 304 to form a bulb 206 in the sleeve shank 14. In one example, the applying 430 the axial bearing force $F_1$ to the sleeve head 30 and the applying 440 the axial pulling force $F_2$ to the threaded shaft 304 are both performed by the tool 300.

Figure 5:
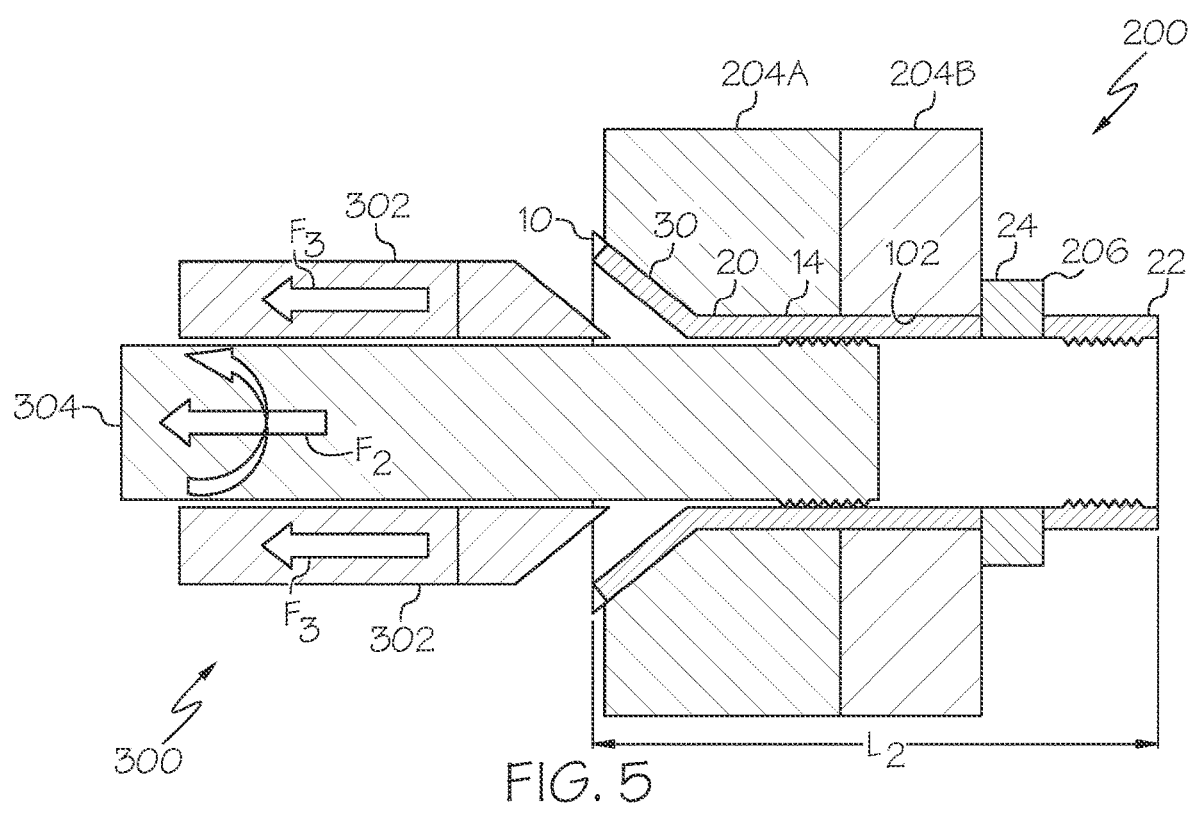
FIG. 5 is a side cross-sectional view of the structural blind sleeve of FIG. 1A in a structure.

Referring to FIG. 10, in one or more examples, the method 400 may further include unthreading 450 the threaded shaft 304 from the threaded portion 22 of the sleeve shank 14. The method 400 may further include removing 460 the tool 300 from the structural blind sleeve 10. FIG. 5 illustrates progression of the unthreading 450 and removing 460 of the tool 300 by applying axial force $F_3$ away from the bulb 206.

Referring to FIG. 10 and FIG. 6A, the method 400 may further include, after the removing 460 the tool 300 from the structural blind sleeve 10, threading 470 a bolt 150 into engagement with the threaded portion 22 of the sleeve shank 14 of the structural blind sleeve 10. In one example, the sleeve shank 14 of the structural blind sleeve 10 includes a softened portion 24 between the structural portion 20 and the threaded portion 22. In one or more examples, the bulb 206 is formed in the softened portion 24 of the sleeve shank 14 upon applying 440 an axial pulling force $F_2$ to the threaded shaft 304.

Figure 11:
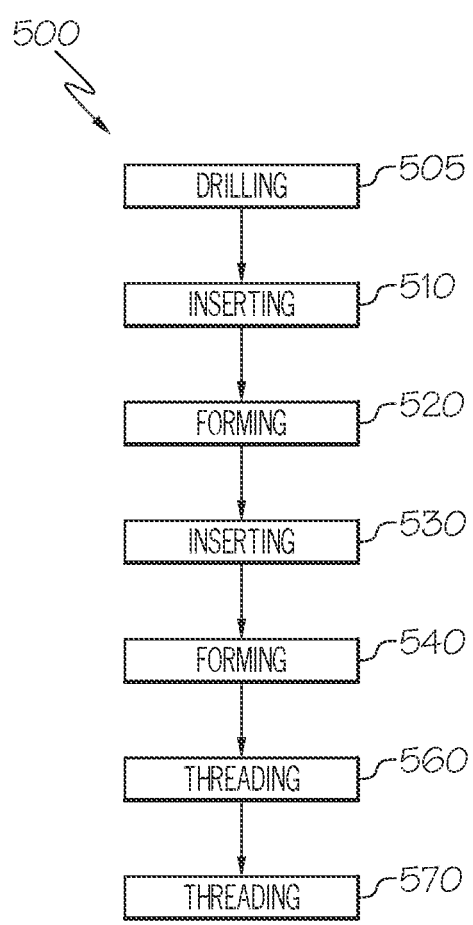
FIG. 11 is a flow diagram of a method for clamping a first structure relative to a second structure.

Referring to FIG. 11, disclosed is a method 500 for clamping a first structure 204A relative to a second structure 204B to yield a clamped-up structure 204. The first structure 204A and the second structure 204B define at least a first through-bore 102 and a second through-bore 102', see FIG. 9.

The method 500 includes inserting 510 a first structural blind sleeve 10 into the first through-bore 102. Optionally, prior to the inserting 510 the first structural blind sleeve 10 into the first through-bore 102, the method 500 may include drilling 505 the first through-bore 102 and the second through-bore 102' in the first structure 204A and the second structure 204B. The first structural blind sleeve 10 includes a sleeve shank 14 having an elongated tubular structure 14a defining a proximal portion 16 and a distal portion 18. The sleeve shank 14 includes a structural portion 20 proximate the proximal portion 16, a threaded portion 22 proximate the distal portion 18, and a softened portion 24 between the structural portion 20 and the threaded portion 22, and a sleeve head 30 connected to the proximal portion 16 of the sleeve shank 14. In one example, the first through-bore 102 is sized and shaped to receive the structural portion 20 of the sleeve shank 14 of the first structural blind sleeve 10 with a clearance fit. In another example, the first through-bore 102 is sized and shaped to receive the structural portion 20 of the sleeve shank 14 of the first structural blind sleeve 10 with an interference fit.

The method 500 further includes forming 520 a first bulb 206 in the first structural blind sleeve 10. In one or more examples, the forming 520 the first bulb 206 in the first structural blind sleeve 10 includes forming 520 the first bulb 206 in the softened portion 24 of the sleeve shank 14 of the first structural blind sleeve 10, see FIG. 9.

Figure 9:
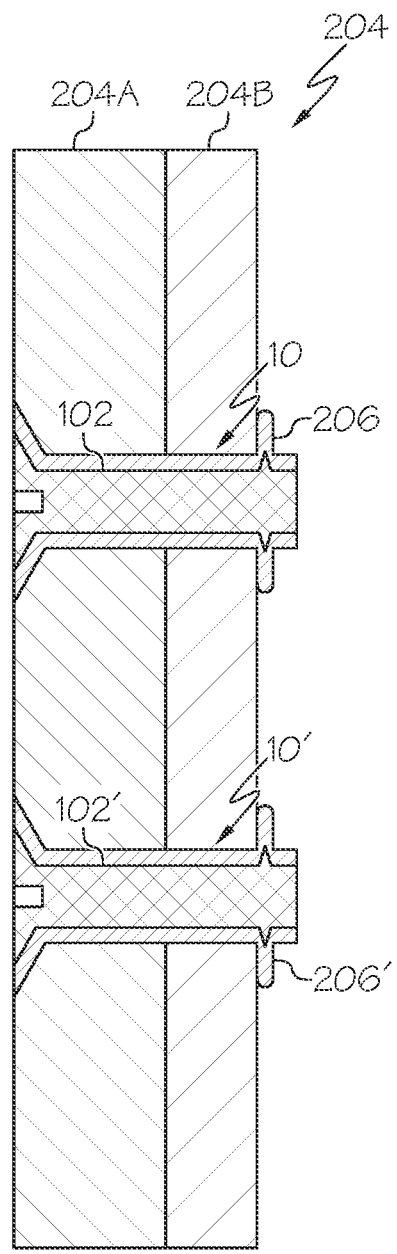
FIG. 9 is a side cross-sectional view of a clamped-up structure.

Still referring to FIG. 9 and FIG. 11, the method 500 further includes inserting 530 a second structural blind sleeve 10' into the second through-bore 102'. In one example, the second structural blind sleeve 10' includes a sleeve shank 14' having an elongated tubular structure 14a' defining a proximal portion 16' and a distal portion 18'. The sleeve shank 14' includes a structural portion 20' proximate the proximal portion 16', a threaded portion 22' proximate the distal portion 18', and a softened portion 24' between the structural portion 20' and the threaded portion 22', and a sleeve head 30' connected to the proximal portion 16' of the sleeve shank 14'.

In one or more examples, the method 500 further includes forming 540 a second bulb 206' in the second structural blind sleeve 10'. In one example, the forming 540 the second bulb 206' in the second structural blind sleeve 10' comprises forming 540 the second bulb 206' in the softened portion 24' of the sleeve shank 14' of the second structural blind sleeve 10'.

Figure 8:
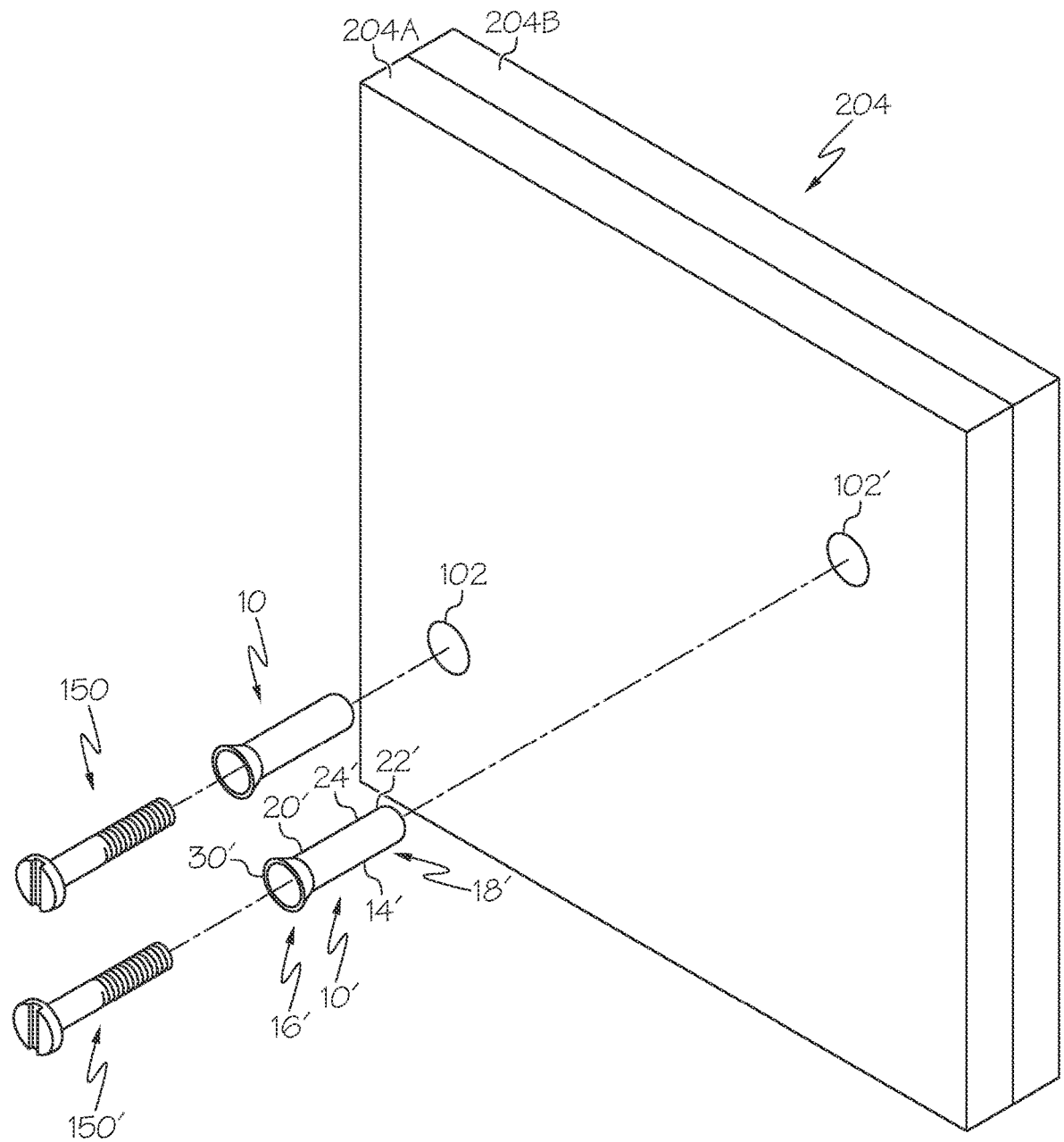
FIG. 8 is a perspective exploded view of a system for clamping a first structure relative to a second structure.

Still referring to FIG. 11, the method 500 further includes threading 560 a bolt 150 into engagement with the first structural blind sleeve 10 after the inserting the second structural blind sleeve 10' into the second through-bore 102', see FIG. 8. The method 500 further includes threading 570 a second bolt 150' into engagement with the second structural blind sleeve 10 after the threading 560 a bolt 150 into engagement with the first structural blind sleeve 10, see FIG. 8.

Referring to FIG. 6B, disclosed is a clamp-up fastener 250. The clamp-up fastener 250 is configured to serve as a tack operation to help tack a first structure 204a with a second structure 204b to yield a stacked assembly prior to it becoming a clamped-up structured 204 upon installation of a fastener or bolt 150. The clamp-up fastener 250 includes a monolithic body 252. The monolithic body 252 has a sleeve shank 254 having an elongated tubular structure 254a. The sleeve shank 254 defines a proximal portion 256 having a sleeve head 260 and a distal portion 258 having a bulb 262. In one or more examples, the clamp-up fastener 250 further includes a threaded portion of the sleeve shank 254 proximate the distal portion 258. The sleeve head 260 may be flanged. In one example, the sleeve head 260 is a countersunk head and may further have a countersink that is approximately 130°. In another example, the sleeve head 260 is a crown head. In yet another example, sleeve head 260 is a protruding head.

Figure 12:
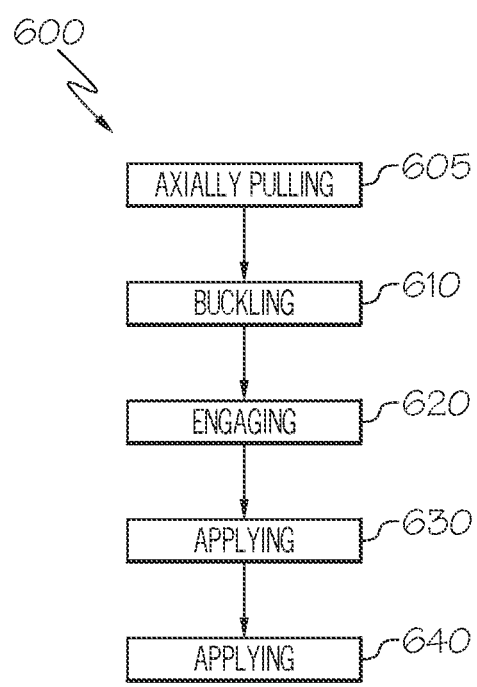
FIG. 12 is a flow diagram of a method for tacking a first structure to a second structure.

Referring to FIG. 12, disclosed is a method 600 for tacking a first structure 204A to a second structure 204B, the first structure 204A and the second structure 204B defining at least a first through-bore 102 and a second through-bore 102'. The method 600 includes buckling 610 a proximal portion 16 of a sleeve shank 14 of a structural blind sleeve 10 to sandwich a first structure 204A to a second structure 204B between a sleeve head 30 and a bulb 206 portion. In one example, the bulb 206 portion of a proximal portion 16 and the sleeve head 30 provides a clamp up to the first structure 204A and the second structure 204B. The buckling 610 includes axially pulling 605 the sleeve shank 14 toward a structural portion 20 of the sleeve shank 14 to form the bulb 206 in the sleeve shank 14.

Still referring to FIG. 12, the method 600 further includes engaging 620 a shaft 304 of a tool 300 with a distal portion 18 of the structural blind sleeve 10, applying 630 an axial bearing force $F_1$ to the sleeve head 30 of the structural blind sleeve 10 to axially retain the sleeve head 30 against the first structure 204A, and applying 640 an axial pulling force $F_2$ to the distal end to buckle the proximal portion 16.

Figure 13:
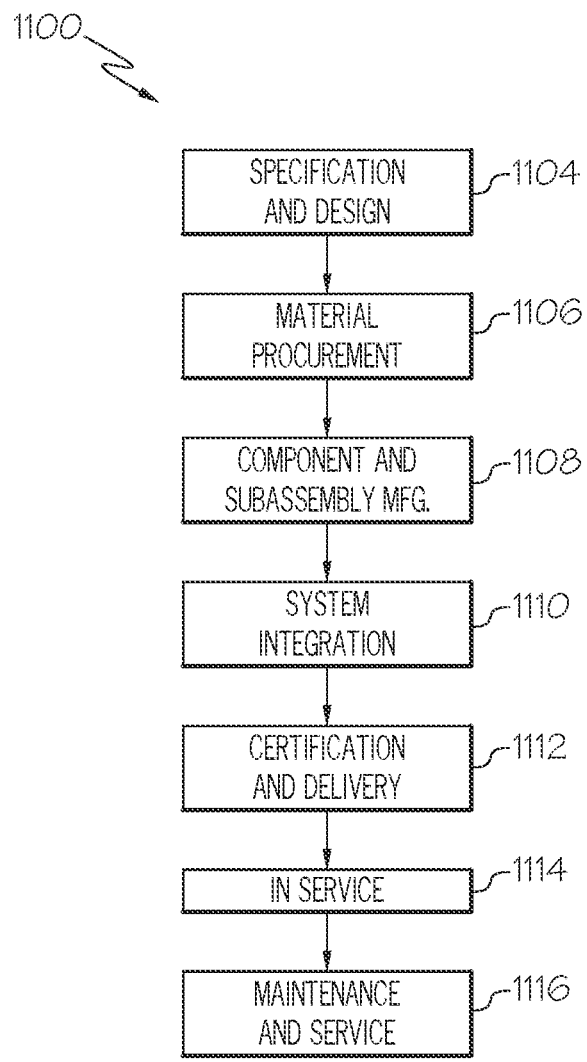
FIG. 13 is a flow diagram of an aircraft manufacturing and service methodology.
Figure 14:
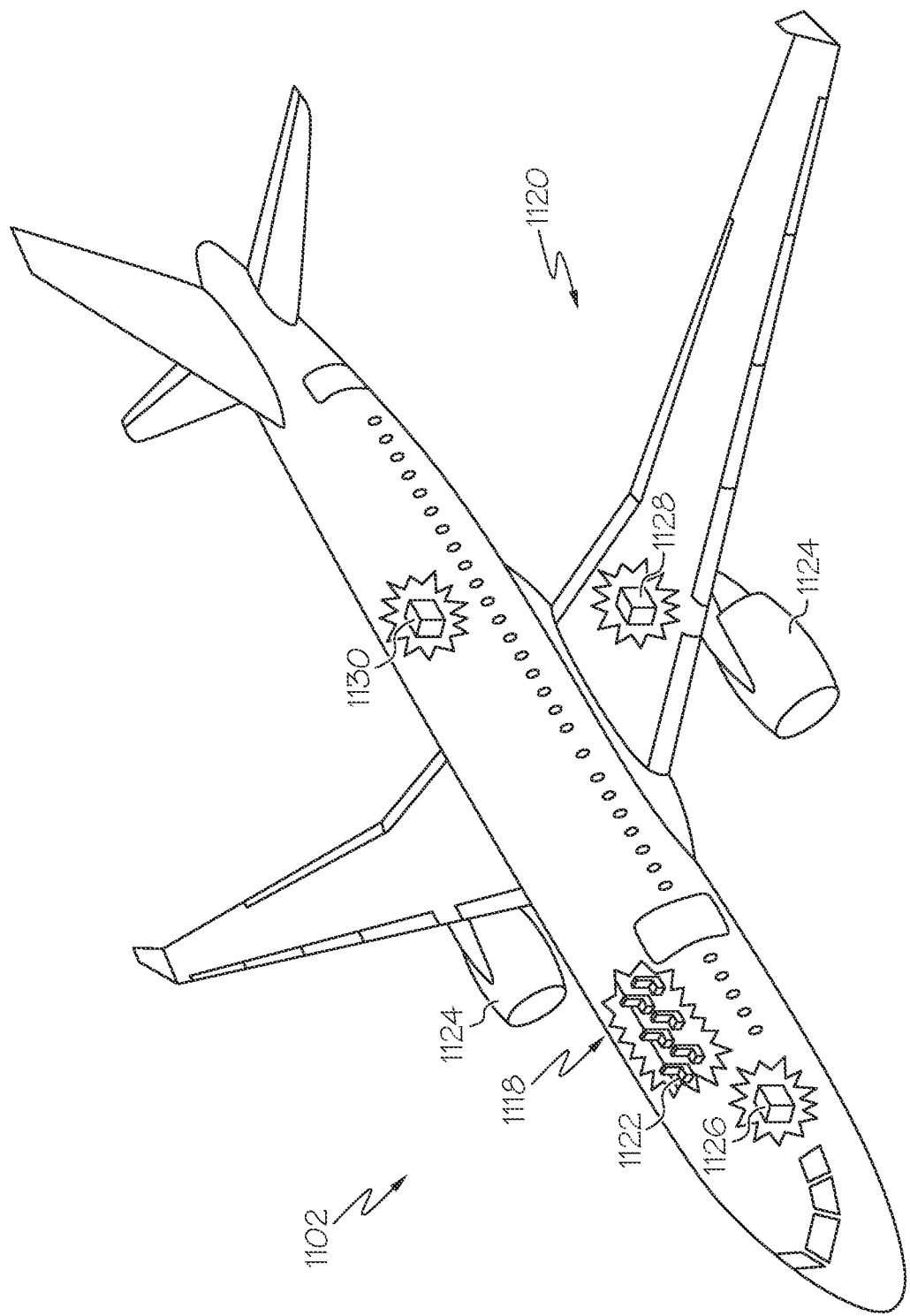
FIG. 14 is a schematic illustration of an aircraft.

Examples of the subject matter disclosed herein may be described in the context of aircraft manufacturing and service method 1100 as shown in FIG. 13 and aircraft 1102 as shown in FIG. 14. During pre-production, service method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of service method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 14, aircraft 1102 produced by service method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

The disclosed structural blind sleeves, methods and systems shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the systems, methods, or combination thereof may be utilized during production stages component and subassembly manufacturing (block 1108) and system integration (block 1110), for example, by substantially expediting assembly of or reducing the cost of aircraft 1102. Similarly, one or more examples of the systems or method realizations, or a combination thereof, may be utilized, for example and without limitation, while aircraft 1102 is in service (block 1114) and/or during maintenance and service (block 1116).

The structural blind sleeves, methods and systems are described in the context of an aircraft. However, one of ordinary skill in the art will readily recognize that the disclosed structural blind sleeves, methods and systems may be utilized for a variety of applications. For example, the disclosed structural blind sleeves, methods and systems may be implemented in various types of vehicles including, e.g., helicopters, watercraft, passenger ships, automobiles, and the like.

Although various examples of the disclosed structural blind sleeves, methods and systems have been shown and described, modifications may occur to those skilled in the art upon reading the specification. The present application includes such modifications and is limited only by the scope of the claims.

What is claimed is:

1. A structural blind sleeve comprising a monolithic body, the monolithic body comprising:
 a sleeve shank having an elongated tubular structure defining a proximal portion and a distal portion, the sleeve shank comprising a structural portion proximate the proximal portion, a threaded portion proximate the distal portion, and a softened portion between the structural portion and the threaded portion, the softened portion of the sleeve shank comprising a notched portion, the notched portion comprising an internal circumferential notch, wherein the structural portion is capable of carrying a clamp-up structural load; and
 a sleeve head connected to the proximal portion of the sleeve shank, the sleeve head comprising a countersink to receive a bearing member of a tool.

2. The structural blind sleeve of claim 1 wherein the structural portion of the sleeve shank comprises a first tensile strength, wherein the softened portion of the sleeve shank comprises a second tensile strength, wherein the first tensile strength is at least 140 ksi, and wherein the second tensile strength is at most 80 percent of the first tensile strength.

3. The structural blind sleeve of claim 1 wherein the structural portion of the sleeve shank comprises a first tensile strength, wherein the softened portion of the sleeve shank comprises a second tensile strength, wherein the first tensile strength is at least 150 ksi, and wherein the second tensile strength is at most 75 percent of the first tensile strength.

4. The structural blind sleeve of claim 1 wherein the structural portion of the sleeve shank comprises a first tensile strength, wherein the softened portion of the sleeve shank comprises a second tensile strength, wherein the first tensile strength is at least 160 ksi, and wherein the second tensile strength is at most 70 percent of the first tensile strength.

5. The structural blind sleeve of claim 1 wherein the clamp-up structural load is at least 95 ksi in shear.

6. The structural blind sleeve of claim 1 wherein the sleeve shank has an outside diameter of about 0.25 inches and a sleeve wall thickness of about 0.015 inches to about 0.030 inches.

7. The structural blind sleeve of claim 1 wherein the softened portion of the sleeve shank is annealed.

8. The structural blind sleeve of claim 1 wherein the softened portion of the sleeve shank comprises a cut or score.

9. The structural blind sleeve of claim 1 wherein the threaded portion of the sleeve shank comprises internal threads.

10. The structural blind sleeve of claim 1 wherein the sleeve shank is tapered from proximate the proximal portion to proximate the distal portion.

11. The structural blind sleeve of claim 1 wherein the monolithic body comprises at least one of stainless steel, aluminum bronze, copper beryllium, copper nickel tin, and a nickel-chromium-molybdenum alloy.

12. The structural blind sleeve of claim 1 wherein the sleeve head is a countersunk head.

13. The structural blind sleeve of claim 1 wherein the monolithic body further comprises an end cap connected to the distal portion of the sleeve shank.

14. The structural blind sleeve of claim 1 wherein the internal circumferential notch comprises a V-shaped notch.

15. A system for clamping a first structure relative to a second structure to yield a clamped-up structure, the first structure and the second structure defining a through-bore, the system comprising:
 a structural blind sleeve comprising:
  a sleeve shank having an elongated tubular structure defining a proximal portion and a distal portion, the sleeve shank comprising a structural portion proximate the proximal portion, a threaded portion proximate the distal portion and a notched portion between the structural portion and the threaded portion, wherein the notched portion comprises an internal circumferential notch; and
  a sleeve head connected to the proximal portion of the sleeve shank; and
 a tool for installing the structural blind sleeve into the through-bore, the tool comprising:
  a bearing member configured to engage the sleeve head of the structural blind sleeve and axially retain the sleeve head against the first structure, the sleeve head comprising a countersink to receive the bearing member of the tool; and
  a threaded shaft configured to engage the threaded portion of the sleeve shank of the structural blind sleeve and for axially pulling the threaded portion toward the structural portion of the sleeve shank to form a bulb in the sleeve shank at the notched portion, wherein the bearing member concentrically surrounds the threaded shaft, and wherein axial pulling of the sleeve shank provides compressive loading on the structural blind sleeve to yield buckling of the sleeve shank at the notched portion.

16. A method for clamping a first structure relative to a second structure to yield a clamped-up structure, the first structure and the second structure defining a through-bore, the method comprising:
 inserting a structural blind sleeve into the through-bore, the structural blind sleeve comprising:
  a sleeve shank having an elongated tubular structure defining a proximal portion and a distal portion, the sleeve shank comprising a structural portion proximate the proximal portion, a threaded portion proximate the distal portion and a notched portion between the structural portion and the threaded portion, wherein the notched portion comprises an internal circumferential notch; and
  a sleeve head connected to the proximal portion of the sleeve shank, the sleeve head comprising a countersink;
 threading a threaded shaft of a tool into engagement with the threaded portion of the sleeve shank of the structural blind sleeve;
 applying an axial bearing force to the sleeve head of the structural blind sleeve to axially retain the sleeve head against the first structure; and
 while the threaded shaft is threaded into engagement with the threaded portion of the sleeve shank and the axial bearing force is applied to the sleeve head, applying an axial pulling force to the threaded shaft to form a bulb at the notched portion in the sleeve shank.

17. A method for clamping a first structure relative to a second structure to yield a clamped-up structure, the first structure and the second structure defining at least a first through-bore and a second through-bore, the method comprising:

inserting a first structural blind sleeve into the first through-bore using a tool, the first structural blind sleeve comprising a sleeve shank and a sleeve head, the sleeve shank comprising a structural portion proximate a proximal portion, a threaded portion proximate a distal portion and a notched portion between the structural portion and the threaded portion, the notched portion comprising an internal circumferential notch, the sleeve head comprising a countersink to receive a bearing member of the tool;

inserting a second structural blind sleeve into the second through-bore;

threading a bolt into engagement with the first structural blind sleeve after the inserting the second structural blind sleeve into the second through-bore;

forming a first bulb in the notched portion of the first structural blind sleeve in response to the threading of the bolt; and forming a second bulb in the second structural blind sleeve.

18. A clamp up fastener comprising a monolithic body, the monolithic body comprising:

a sleeve shank having an elongated tubular structure, the sleeve shank defining a proximal portion connected to a sleeve head and a distal portion, the sleeve shank comprising a structural portion proximate the proximal portion, a threaded portion proximate the distal portion and a notched portion between the structural portion and the threaded portion, the notched portion comprising an internal circumferential notch, the sleeve head comprising a countersink to receive a bearing member of a tool, the notched portion configured to form a bulb under compression of the sleeve shank.

19. A method for tacking a first structure to a second structure, the first structure and the second structure defining at least a first through-bore and a second through-bore, the method comprising:

inserting a structural blind sleeve into the first through-bore using a tool, the structural blind sleeve comprising a sleeve shank and a sleeve head, the sleeve shank comprising a structural portion proximate a proximal portion, a threaded portion proximate a distal portion and a notched portion between the structural portion and the threaded portion, wherein the notched portion comprises an internal circumferential notch;

threading a bolt into engagement with the structural blind sleeve; and buckling the notched portion of the sleeve shank of the structural blind sleeve to form a bulb in the notched portion and sandwich the first structure to the second structure between the sleeve head and the bulb, wherein the sleeve head has a countersink to receive a bearing member of a tool.

20. The method of claim 19, further comprising:

engaging a shaft of the tool with the distal portion of the structural blind sleeve;

applying an axial bearing force to the sleeve head of the structural blind sleeve to axially retain the sleeve head against the first structure; and applying an axial pulling force to the distal portion to buckle the notched portion.

* * * * *